US010868664B2

(12) United States Patent
Goldin et al.

(10) Patent No.: US 10,868,664 B2
(45) Date of Patent: Dec. 15, 2020

(54) MINIMIZING TIMESTAMP ERROR IN PTP SYSTEMS

(71) Applicant: Integrated Device Technology, Inc., San Jose, CA (US)

(72) Inventors: Leonid Goldin, Ottawa (CA); Michael Rupert, Ottawa (CA)

(73) Assignee: INTEGRATED DEVICE TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/515,991

(22) Filed: Jul. 18, 2019

(65) Prior Publication Data

US 2020/0028666 A1 Jan. 23, 2020

Related U.S. Application Data

(60) Provisional application No. 62/701,413, filed on Jul. 20, 2018, provisional application No. 62/703,286, filed on Jul. 25, 2018.

(51) Int. Cl.
*H04L 7/08* (2006.01)
*H04L 7/00* (2006.01)

(52) U.S. Cl.
CPC .............. *H04L 7/08* (2013.01); *H04L 7/0016* (2013.01)

(58) Field of Classification Search
CPC ........ H04L 7/08; H04L 7/0016; H04J 3/0644; H04J 3/0697; H04J 3/0667
See application file for complete search history.

(56) References Cited

U.S. PATENT DOCUMENTS

| | | | |
|---|---|---|---|
| 2013/0121347 A1* | 5/2013 | Saito | H04J 3/0697 370/474 |
| 2017/0093512 A1* | 3/2017 | Zhu | H04J 3/0682 |
| 2018/0039485 A1* | 2/2018 | Wilber | G06F 7/588 |
| 2019/0138047 A1* | 5/2019 | El Kolli | G06F 1/12 |
| 2019/0379475 A1* | 12/2019 | Seethamraju | H04J 3/0632 |

* cited by examiner

*Primary Examiner* — Syed Haider
(74) *Attorney, Agent, or Firm* — Haynes and Boone, LLP

(57) ABSTRACT

In accordance with some embodiments of the present invention, a method of minimizing timing error in a precise timing protocol system includes receiving an input 1PPS signal and a clock signal; outputting an output 1PPS signal a number of clock edges after receipt of the input 1PPS signal; adjusting the clock signal until the output 1PPS signal as jumped a clock cycle; and adjusting an offset to bring the output 1PPS signal to within a half clock period. In some embodiments, further adjustments can be made to the timestamp.

3 Claims, 4 Drawing Sheets

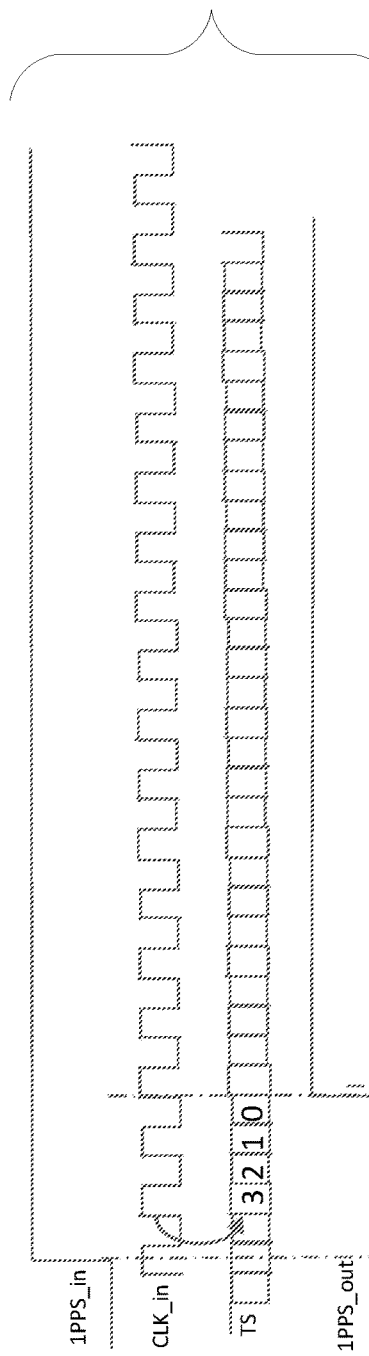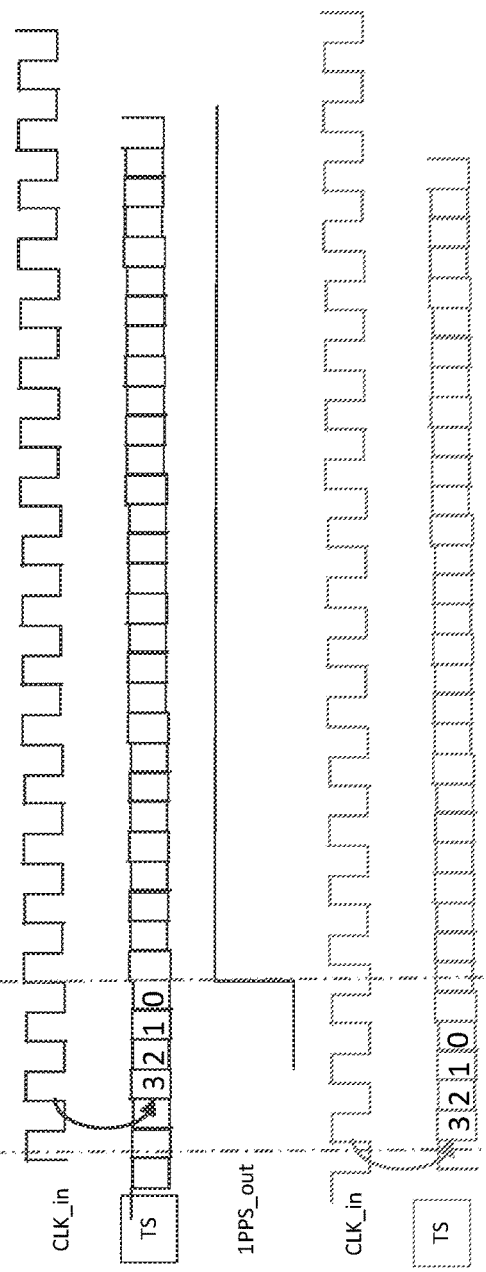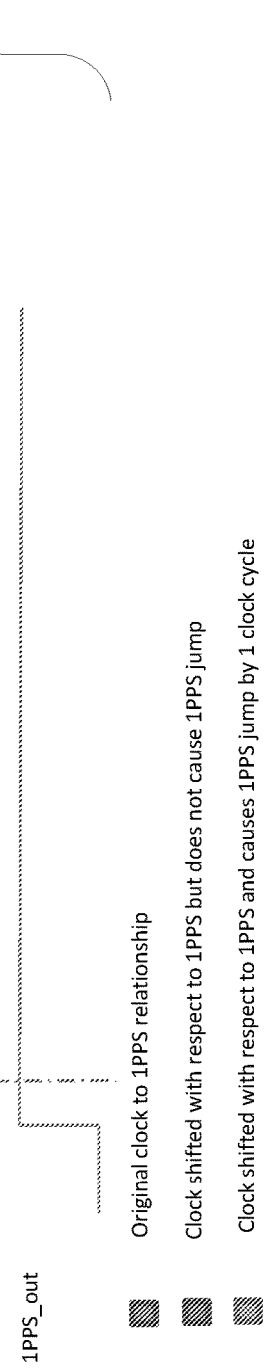

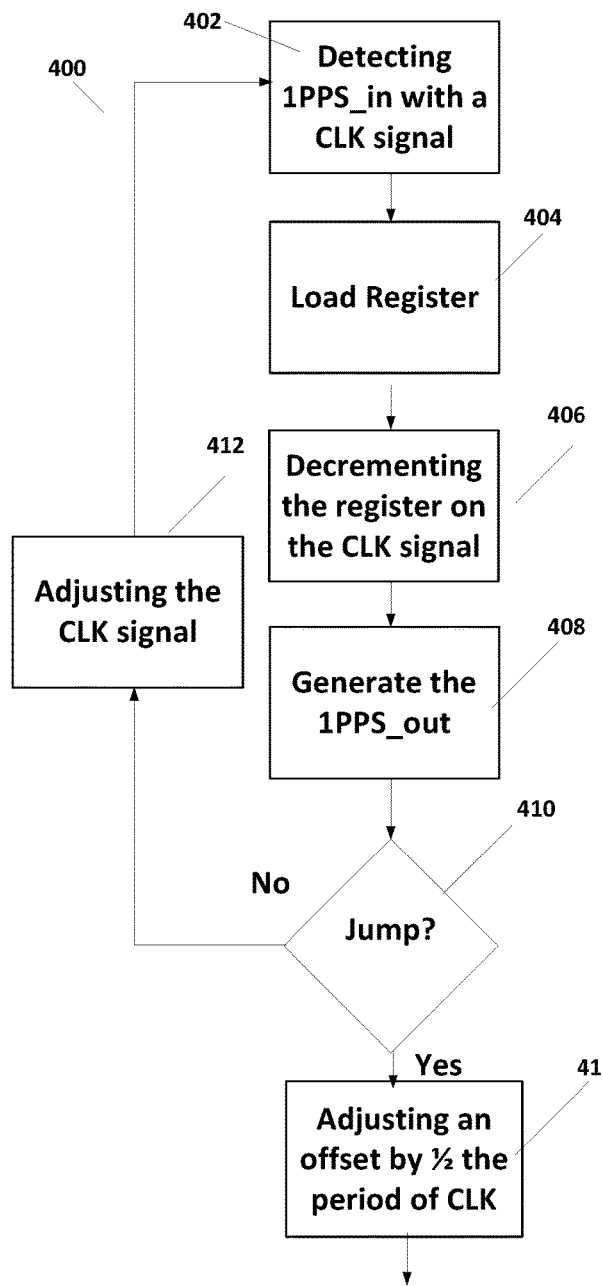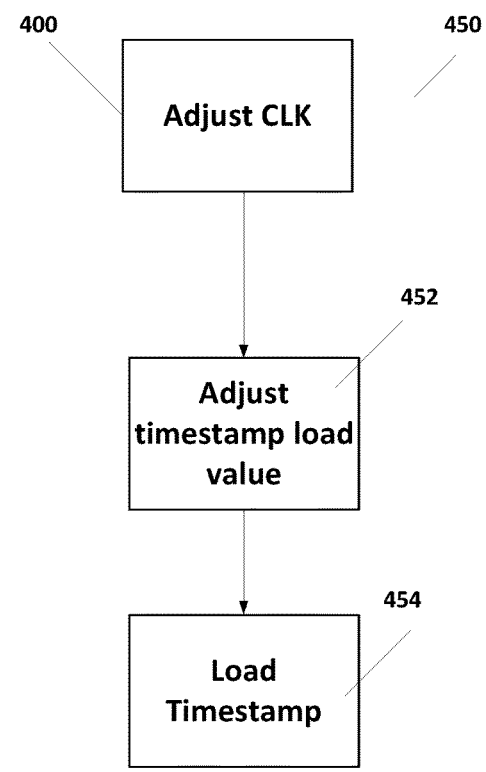
Figure 4A
Figure 4B

MINIMIZING TIMESTAMP ERROR IN PTP SYSTEMS

RELATED APPLICATIONS

This disclosure claims priority to U.S. Provisional Application Ser. No. 62/701,413, entitled "Minimizing Timestamp Error in PTP Systems," by Leon Goldin and Michael Rupert, filed on Jul. 20, 2018, and claims priority to U.S. Provisional Application Ser. No. 62/703,286, entitled "Correcting Timestamp Error with Insufficient Resolution," by Leon Goldin, filed on Jul. 25, 2018, both of which are herein incorporated by reference in their entirety.

TECHNICAL FIELD

Embodiments of the present invention are related to systems that employ precise time protocol (PTP) and, in particular, to reducing timestamp error in these PTP systems.

DISCUSSION OF RELATED ART

Precise time protocol, as is described in the IEEE1588 standard, is used in various network systems, especially where precise synchronization is desired throughout the network system. PTP can be used in systems that depend on coordinated actions, such as robotic automation and control systems; measurement and automatic test systems; power generation, transmission and distribution systems; ranging, telemetry and navigation systems; and various telecommunications systems. In some of these networks, precise timing coordination between the network elements is important to the safe and efficient execution of the purpose of the network. In particular, PTP provides a method to precisely synchronize devices over a Local Area Network (LAN). Although in some cases, PTP is capable of synchronizing multiple clocks to better than 100 nanoseconds on a specifically designed LAN, better timing precision is sought for various applications.

Therefore, there is a need to develop systems that can provide better synchronization in a PTP driven system.

SUMMARY

In accordance with some embodiments of the present invention, a method of minimizing timing error in a Precisions Timing Protocol (PTP) local-area network (LAN) system includes receiving an input one-pulse-per-second (1PPS) signal and a clock signal; outputting an output 1PPS signal a number of clock edges after receipt of the input 1PPS signal; adjusting the clock signal until the output 1PPS signal has jumped a clock cycle; and adjusting an offset to bring the output 1PPS signal to within a half clock period.

In accordance with some embodiments of the present invention, a method of setting a time stamp is presented. The method includes receiving an input 1PPS signal and an input clock signal; adjusting the input clock signal to within one half the clock signal; receiving a further correction of the output 1PPS signal; and providing the time stamp that accounts for the one half clock signal adjustment and the further correction.

These and other embodiments are further discussed below with respect to the following figures.

BRIEF DESCRIPTION OF THE DRAWINGS

FIGS. 2A, 2B, and 2C illustrate operation of a PTP system to minimize timestamp error according to some embodiments of the present invention.

FIGS. 4A and 4B illustrate processes for operation of a timestamp system according to some embodiments of the present invention.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Some embodiments of the present invention provide for precise timing even when large errors, errors larger than a total alignment requirement, are present in a network. In some embodiments, a method of minimizing timing error in a Precisions Timing Protocol (PTP) local-area network (LAN) system includes receiving an input one-pulse-per-second (1PPS) signal and a clock signal; outputting an output 1PPS signal a number of clock edges after receipt of the input 1PPS signal; adjusting the clock signal until the output 1PPS signal has jumped a clock cycle; and adjusting an offset to bring the output 1PPS signal to within a half clock period. Some embodiments also include further adjusting the timestamp to account for a half clock signal adjustment. The method includes receiving an input 1PPS signal and an input clock signal; adjusting an output 1PPS signal to within one half the clock signal; receiving a further correction of the output 1PPS signal; and providing the time stamp that accounts for the one half clock signal adjustment and the further correction.

Figure 1A:
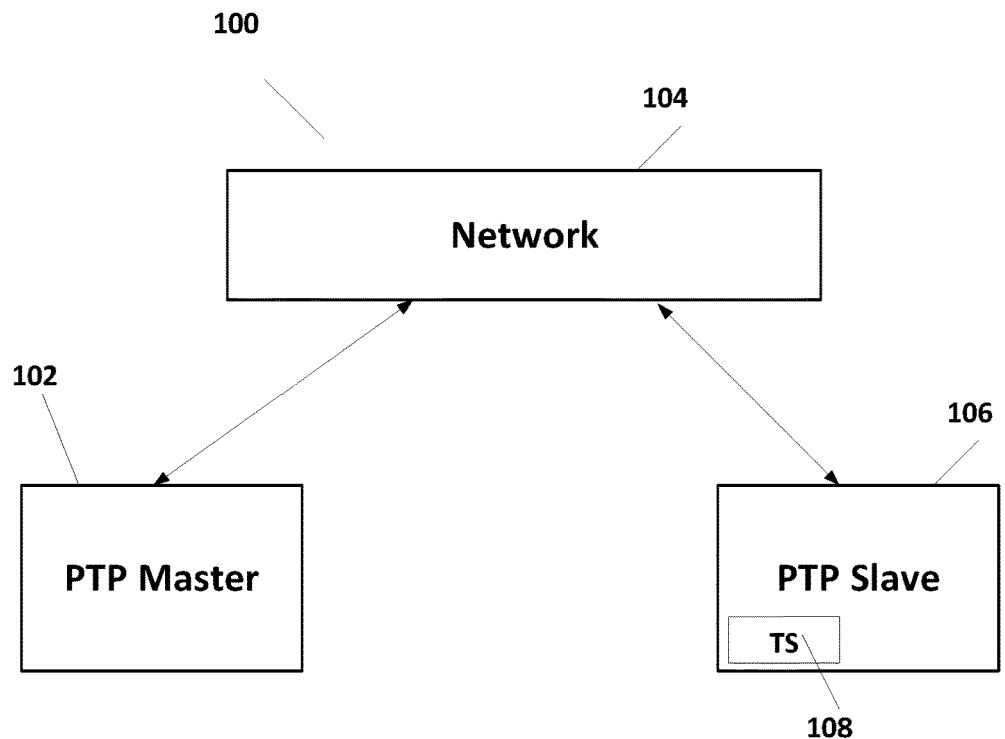
FIGS. 1A and 1B illustrate PTP system.

FIG. 1A illustrates a PTP compatible system 100. As illustrated in FIG. 1A, system 100 includes a master 102 that is coupled to a slave 106 through a network 104. PTP uses a time-stamp system to align timing on master 102 and slave 106. This can be accomplished in hardware, in software, or in a combination of hardware and software. In some embodiments, master 102 can be locked to a Global Positioning System (GPS), which can provide precise timing (with accuracy better than 30 ns). In such a case, master 102 (sometimes referred to as a Grandmaster) incorporates a local reference oscillator that is synchronized with the GPS time and used with dedicated hardware for precise time-stamping of incoming delay request and outgoing sync packets. A one-pulse-per second (1PPS) sync signal from master 102 can be synchronized with a similar 1PPS signal in slave 106 to provide for precise time stamping. In some embodiments, slave 106 can include hardware timestamps with a software daemon to provide precise nanosecond timestamp resolution. In some embodiments, slave 106 can utilize a software implementation. However, such a solution should compensate for software delays and the quality of the timestamping in a purely software driven implementation may be more imprecise. FIG. 1A illustrates a timestamper (TS) 108 in slave 106 that synchronizes the 1PPS signal generated by master 102 with the internal clock CLK.

Figure 1B:
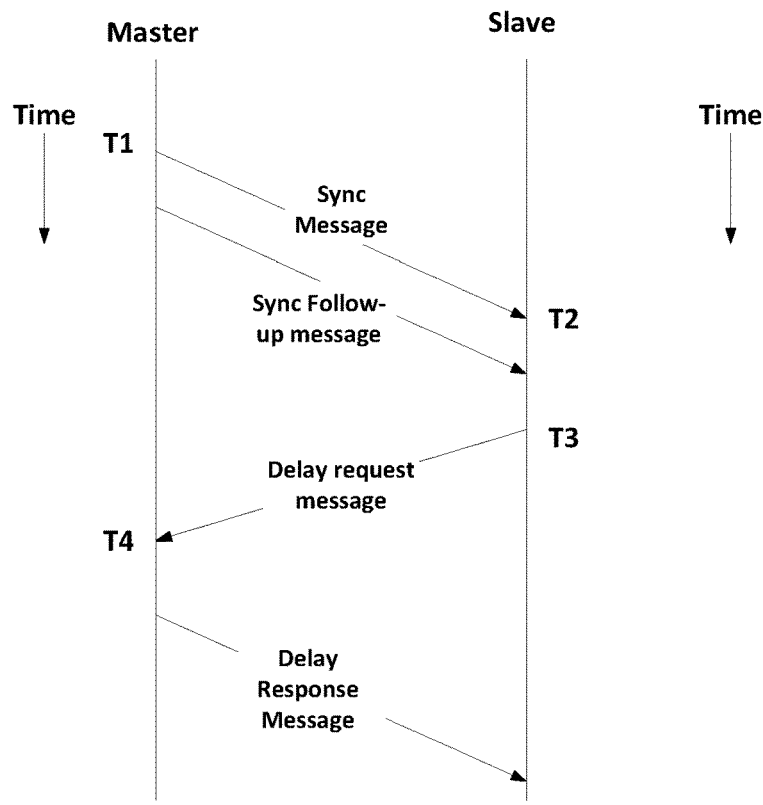

FIG. 1B further illustrates the PTP system 100. The protocol defines synchronization messages between master 102 and slave 106. Master 102 provides time and slave 106 synchronizes time to that defined by master 102. Messages exchanged in the protocol includes the Master Sync Message, the Master Delay Message, and the Slave Clock Delay Request Message. Each slave 106 in a system synchronizes to the timing of master 102. Multiple slaves 106 can be synchronized to the master 102. In the protocol, precise timestamps are captured at both master 102 and slave 106 clocks. These timestamps can then be used to determine the network latency to synchronize slave 106 to master 102.

Four timestamps are captured between master 102 and slave 106, commonly referred to as time stamps T1, T2, T3, and T4. As illustrated in FIG. 1B, master 102 provides a sync message that is timestamped T1, the sync message being received by slave 106 and timestamped time T2. The sync message is transmitted periodically, for example every two seconds, from master 102. The first time stamp T1 is the precise time that the sync message is transmitted from master 102 and is sent in the sync follow-up message. The second time stamp T2 is the precise time that the sync message is received at slave 106. The time delay between master 102 and slave 106 can then be calculated as T2-T1. The third time stamp T3 is the precise time that a delay request message is sent from slave 106 and the fourth time stamp T4 is the precise time that the delay request is received from the master. Consequently, the delay from slave to master is T4-T3. The delay response message can be periodically available to compare the time delays between master 102 and slave 106. Meanwhile, master 106 continues to provide the 1PPS signal to keep the timings in synchronization.

Modern networks utilize precise time protocol (PTP) described in IEEE1588 standard for precise time distribution. The protocol uses methods of timestamping packets on arrival and departure of a Network Element (NE), or slave 106, to synchronize the clock at each NE slave 106. In order for time distribution to be accurate, the timestamps on one port have to be aligned with timestamps on other ports. The latest requirements from mobile operators call for a 5 ns alignment between timestampers of different ports on slaves 106. Several methods of distributing time indicator in multi card NEs with sub-ns accuracy have been disclosed. However, the modern physical layers (PHYs) or Media Access Control layers (MACs), where timestampers 108 are located, can introduce an error larger than a total alignment requirement.

Normally time alignment is distributed by time indicator, as discussed above. It is accepted by majority of system vendors that the one Pulse per Second (1PPS) signal emitted from master 106 is the way to distribute time throughout system 100. However, it takes time for the 1PPS signal propagate to the actual timestamper 108 within a chip of the network element slave 106. Also, the timestamper 108 runs on a PTP derived clock, which also needs to propagate to and advance the timestamper 108. A vast majority of timestampers run at a clock speed of 125 MHz. That means that the timestamp counter in the timestamper 108 increments (or decrements) every 8 ns, which is larger than the allowed error. The delays inside the integrated circuit chips that form the timestamper 108 are unknown and the relationship between the clock and the 1PPS at the internal timestamper 108 can be anything, which can cause difficulty for the timing alignment.

Some embodiments of the present invention identify the relationship between the 1PPS signal and the PTP clock at the timestamper 108 and use this relationship (i.e. offset) as a correction value for the timestamp counter. Some embodiments include a device on the board which can measure phase offset between two signals, such as with Time to Digital Conversion (TDC) modules that are currently available from Integrated Device Technology, Inc. Further, embodiments include a timestamping device that outputs a 1PPS signal when a counter in the timestamper hits a specific value, usually 0.

In order to find the relationship between the 1PPS signal and the PTP clock inside the timestamping device 108, the PLL which drives both of them can run a training pattern. The training pattern will slide a phase between the 1PPS signal and the PTP clock by adjusting the output phase of the PTP clock. The timestamper will be loaded every time with a predefined value when the 1PPS signal is sampled at the timestamper. With every phase offset the offset between input and output 1PPS signal will be measured. While the 1PPS signal is sampled within a clock cycle of the clock it will move smoothly. But at some moment, the 1PPS signal will cross a clock edge and will be sampled with another clock edge. This will cause an 8 ns jump on the output 1PPS signal versus the input 1PPS signal. This will indicate that the PTP clock and the 1PPS signal are very closely aligned.

The PTP clock can be shifted by a specific value, preferably half of the clock cycle after the transition is found. For 125 MHz that shift would be 4 ns. Then the timestamp calculation can take these 4 ns into account when updating its initial value at every 1PPS signal coming in. This method removes the uncertainty of 8 ns for a 125 MHz clock. In general, for any other clock cycle, shift can be half the clock period.

FIGS. 2A, 2B, and 2C illustrate an example operation according to some embodiments of the present invention. Such operation is performed in a timestamper 108 of a slave 106. FIG. 2A shows that when the input 1PPS signal 1PPS_in is sampled, the timestamper (TS) counter is loaded with a particular value, in this example 3, when 1PPS_in is sampled with the CLK_in signal, in this case on the next rising clock-edge after arrival of 1PPS_in. The counter is decremented on each following clock transition edge of the input clock CLK_in. When the value in the counter becomes 0, the output 1PPS signal 1PPS_out is generated on the next edge of CLK_in. By observing the relationship between 1PPS_in and 1PPS_out, a shift SW can determine when the clock cycle is changed and correct a loading value. In FIG. 2A, the rising edge of 1PPS_in arrives offset from the rising edge of CLK_in, which results in a delay of loading the TS register In FIG. 2B, the clock is shifted, but this does not cause a jump so that the output 1PPS signal is output on the same edge of CLK_in. As illustrated in FIG. 1C, the clock is shifted with respect to the 1PPS signal as suggested above, which results in a shift of the output 1PPS signal by 1 clock cycle, at which time the ½ period correction should be made. Consequently, instead of a precise 1 sec, for example, the initial value of the clock offset should be shifted by ½ the period of CLK_IN, or the clock adjustment will be initialized with a value of 1 sec+4 ns, which removes the possibility of a shift in the output of 1PPS_out.

FIG. 4A illustrates a process 400 for operation on timestamper 108 as discussed above. AS illustrated in FIG. 4A, in step 402 timestamper 108 detects according to the CLK_In signal the presence of an asserted 1PPS_in signal, as is illustrated in FIG. 2A. In step 404, upon detection, timestamper 108 loads a register, as is also illustrated in FIG. 2A. In step 406, timestamper 108 decrements the register based on the edges of the CLK_in signal until the register reaches 0. In step 408, when the register reaches 0 in step 406, timestamper 108 generates a 1PPS_out signal. In step 410, timestamper 108 checks to see if the 1PPS_out clock has shifted by 1 clock cycle relative to the 1PPS_out signal generated in previous iterations. If no, then process 400 proceeds to step 412 where an adjustment to the CLK-in signal is determined based on a comparison of the 1PPS_in signal and the 1PPS_out signal. After step 412, process 400 returns to step 402 for detection of the next 1PPS_in signal in the next iteration. However, if in step 410, timestamper 108 determines that a jump has been made, as is demonstrated in FIG. 2C, then process 400 proceeds to step 414. In step 414, timestamper 108 provides a ½ period offset of CLK. At the end of step 414, an adjustment of the CLK signal in response to 1PPS_in has been made.

The discussion above provides a prosses to fix uncertainty between the 1PPS signal and the PTP clock signal at the timestamper 106. But even if this uncertainty is known, the resolution of timestamper 108 is often not sufficient to meet the required adjustment. For example, if the timestamp needs to be adjusted by 2.5 ns, that adjustment will not be possible with the 8 ns resolution of the typical timestamp. The 1PPS signal can be properly adjusted but the timestamp itself will be incorrect.

Figures 3A, 3B:
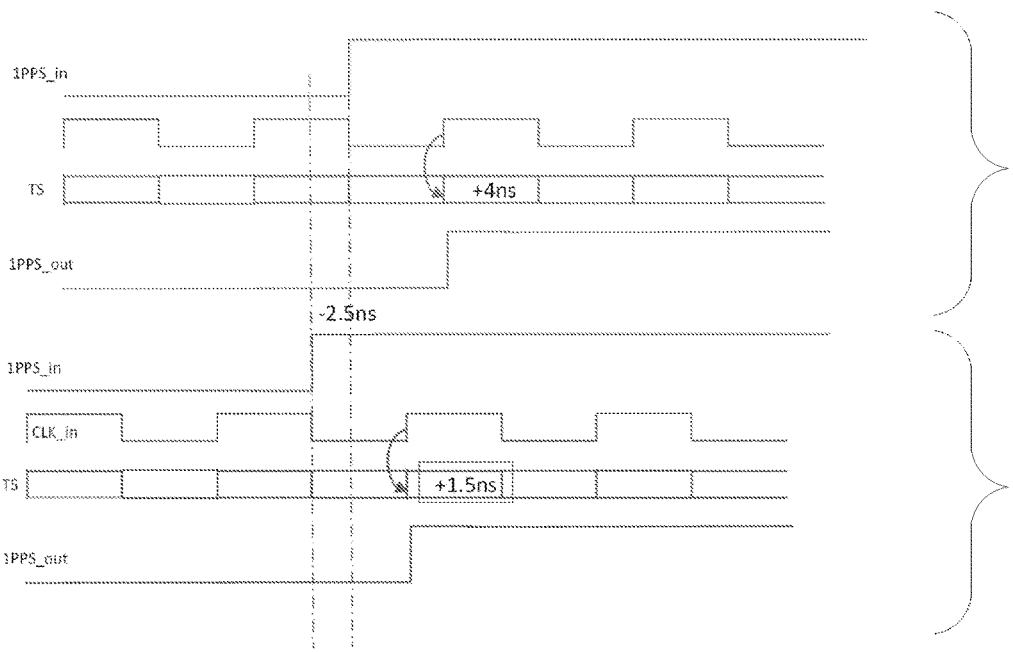
FIGS. 3A and 3B illustrate operation of a PTP system to correct timestamp error according to some embodiments of the present invention.

Embodiments of the present invention use an ability to correct a load value of a timestamper when the 1PPS signal is received. As discussed above, the relationship between the PTP clock and the 1PPS signal is established to half of the PTP clock cycle. For an 8 ns clock cycle, that means that the 1PPS signal can be adjusted to within 4 ns, which will be a correction factor when the timestamper 108 is loaded at the 1PPS signal. This process is illustrated in FIG. 3A, which illustrates the clock signal, the input 1PPS signal, the output 1PPS signal, and the time stamp adjustment of +4 ns appropriate for the 4 ns adjustment of the 1PPS output signal.

FIG. 4B illustrates a process 450 according to some embodiments. At the beginning of clock recovery, timestamper 108 adjusts the 1PPS phase within one PTP clock cycle accuracy from the target, +/−4 ns in the above example, as indicated in step 400 of process 450. In step 452, timestamper 108 adjusts the timestamp load value while fine tuning the 1PPS signal position. For example, if timestamper 108 calculates that it is +2.5 ns from a target time, the 1PPS signal needs to be moved by −2.5 ns to the ideal target signal. At the same time timestamper 108 adjusts the load value by −2.5 ns. In step 454 as illustrated, and as demonstrated in FIG. 3B, instead of loading predefined +4 ns timestamper 108 will load timestamp counter by 4−2.5=1.5 ns. This way the timestamper can be aligned with sub-clock cycle accuracy and deliver the required results. At the same time, the known relationship between the 1PPS signal and the PTP clock remains intact and timestampers do not need to run with sub-ns resolution, which would mean timestamp clocks faster than 1 GHz. FIG. 3B illustrates the 1PPS input signal, the clock input signal, the 1PPS output signal, and the time stamp according to this embodiment.

The above detailed description is provided to illustrate specific embodiments of the present invention and is not intended to be limiting. Numerous variations and modifications within the scope of the present invention are possible. The present invention is set forth in the following claims.

What is claimed is:

1. A method of minimizing timing error in a precise timing protocol system, comprising:
   receiving an input one-pulse-per-second (1PPS) signal and a clock signal;
   outputting an output 1PPS signal a number of clock edges after receipt of the input 1PPS signal;
   adjusting the clock signal until the output 1PPS signal has jumped a clock cycle; and
   adjusting an offset to bring the output 1PPS signal to within a half clock period.

2. A method of setting a time stamp, comprising:
   receiving an input one-pulse-per-second (1PPS) signal and an input clock signal;
   adjusting the input clock signal to within one half of the input clock signal;
   receiving a further correction of an output of the 1PPS signal; and
   providing the time stamp that accounts for the one half of the input clock signal adjustment and the further correction.

3. The method of claim 2, wherein adjusting the input clock signal comprises: receiving the input 1PPS signal and a clock signal;
   outputting the output 1PPS signal a number of clock edges after receipt of the input 1PPS signal;
   adjusting the clock signal until the output 1PPS signal has jumped a clock cycle; and
   adjusting an offset to bring the output 1PPS signal to within a half clock period.

* * * * *